Feb. 22, 1927. 1,618,536
H. JUNKERS
ERECTION OF THE HULLS AND THE LIKE OF FLYING MACHINES
Filed July 22, 1925
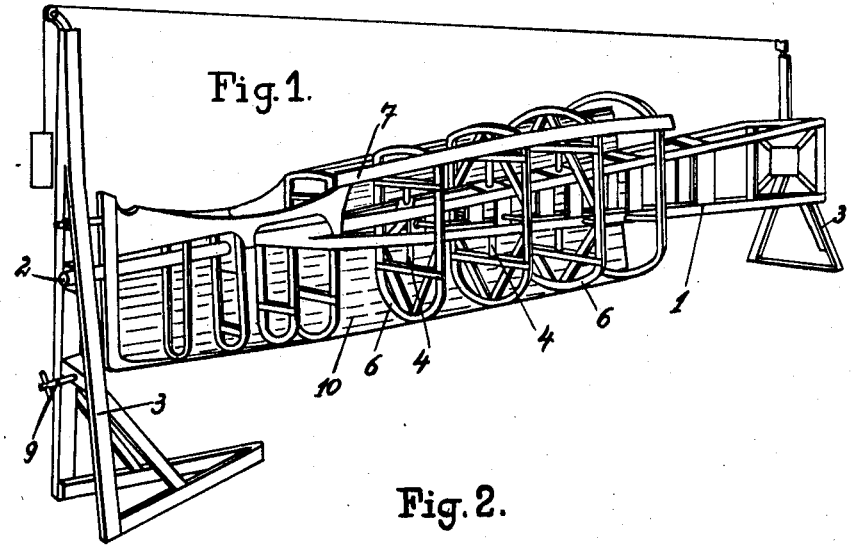
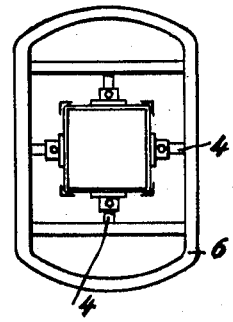
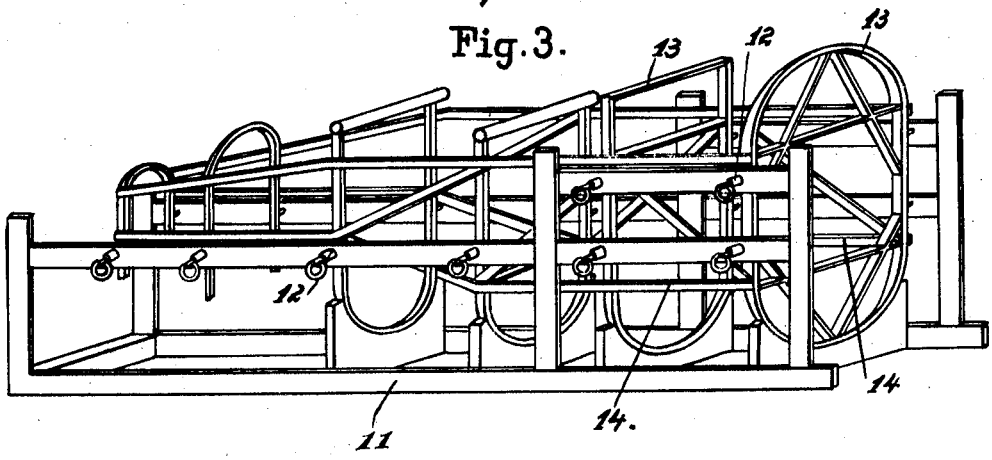
Inventor:
Hugo Junkers
by Knichaen
Atty.

Patented Feb. 22, 1927.

1,618,536

UNITED STATES PATENT OFFICE.

HUGO JUNKERS, OF DESSAU, GERMANY.

ERECTION OF THE HULLS AND THE LIKE OF FLYING MACHINES.

Application filed July 22, 1925, Serial No. 45,380, and in Germany August 8, 1924.

My invention refers to the erection and assembling of the skeleton and covering of the hull or fuselage and similar hollow bodies forming part of an aeroplane or other flying machine. It is an object of my invention to provide means whereby such bodies can be erected and assembled in an easier and more effective manner than was hitherto possible.

According to the present invention the hollow body to be erected is built around a longitudinal support or girder supported at its ends and carrying the templets or the like. By thus supporting all the templets on a rigid inner support or girder the entire body is rendered freely accessible from without in all phases of erection and the cross frames can easily be mounted in place.

In the construction of fuselages for flying machines that part of the fuselage which connects the wings, rudders or elevators on the one hand and the part carrying the engine, crew and passengers on the other hand can be erected separately and are then only put together. This involves a great simplification inasmuch as in assembling the first mentioned part of the fuselage no consideration need be paid to the single frames required for supporting the engine in the front portion of the craft, these frames as a rule forming an obstacle to the erection of the other parts of the hull.

By aid of the present invention I am also enabled to easily and simply erect flying machines in which a wing structure extending right across the fuselage carries not only the fore part of the fuselage and the engine, but also the tail portion of the fuselage, each of these parts forming a structural unit.

I further provide an exterior fixture for the construction of the fore part of the hull designed to take up the engine, this fixture together with the templets required for the fixation in place of the several parts surrounding it from without.

In a preferred form of my invention the inner support has the form of a light lattice girder which carries the templets for the main parts to be mounted in place and which is mounted at its ends in bearings which are so arranged that the girder can easily be disengaged therefrom.

In the drawings affixed to this specification and forming part thereof a device embodying my invention is illustrated diagrammatically by way of example.

In the drawings:—

Fig. 1 is a perspective view of a longitudinal support or girder supported at its ends and carrying the templets and/or cross frames of the tail portion of a fuselage.

Fig. 2 is a cross section.

Fig. 3 is a perspective view of a fixture supporting the fore part of a fuselage.

Referring first to Fig. 1, 1 is a lattice girder rotatably and disengageably mounted with journals 2 in two supports 3. Templets 4 are mounted on the girder 1 for holding the single parts of the fuselage in correct position.

Fig. 2 shows the way in which the cross frames 6 are mounted on the templets 4. A pin 9 in the rear support 3, which can be inserted in the stern portion of the fuselage allows fixing the fuselage in position and prevents its rotation about the journals 2. By withdrawing the pin 9 the fuselage can easily be rotated about its longitudinal axis, thereby rendering all parts readily accessible. Fig. 1 further shows how, after the cross frames 6 have been mounted in place on the girder and templets, the longéron 7 and the outer skin 10 which also serves as a longitudinal bracing member can be mounted on the cross frames 6.

The fixture 11 illustrated in Fig. 3 and serving for the construction of the fore part of the fuselage has a number of adjustable pins or bolts 12 serving for fixing in place the main frame 13, and longérons 14, which have previously been constructed and are now connected with each other to form the skeleton. The covering is mounted in place after the skeleton has been removed from the fixture.

The two parts of the fuselage erected separately as shown in Figs. 1 and 3 are then connected by intermediate ties or struts or are mounted together on the central section of the wing.

I wish it to be understood that I do not desire to be limited to the exact details of construction shown and described for obvious modifications will occur to a person skilled in the art.

I claim:—

The method of building the fuselage of a flying machine comprising assembling the parts constituting the rear half of the fuselage around a rotary template support, the parts constituting the front half, which is designed to carry the engine, within a templet carrying jig, stripping the halves thus produced from their supports and uniting said halves.

In testimony whereof I affix my signature.

HUGO JUNKERS.